United States Patent Office 3,149,183
Patented Sept. 15, 1964

3,149,183
TERNARY BLENDS OF VINYL CHLORIDE POLYMER-STYRENE/ACRYLONITRILE COPOLYMER CHLOROSULFONATED ETHYLENE POLYMER AND PROCESS FOR MAKING THE SAME
Ival O. Salyer and Harry Philip Holladay, Dayton, Ohio, assignors to Monsanto Company, a corporation of Delaware
No Drawing. Filed July 22, 1960, Ser. No. 44,573
7 Claims. (Cl. 260—897)

This invention relates to vinyl chloride polymers. In one aspect, this invention relates to vinyl chloride compositions comprising ternary blends of vinyl chloride polymer, styrene/acrylonitrile copolymer and chlorosulfonated ethylene polymer. In another aspect, this invention relates to methods for making ternary blends of vinyl chloride polymer, styrene/acrylonitrile copolymer and chlorosulfonated ethylene polymer.

The many valuable properties of vinyl chloride polymers are well known and these polymers have become important commercially. Many of the vinyl chloride polymers are characterized as hard and rigid plastics but some of these polymers are not easily processed in conventional operations because of their thermoplasticity characteristics. It is known that the processability of the vinyl chloride polymers can be improved by the incorporation of a plasticizer in the polymer, but the resulting composition is also softened and weakened, thereby limiting the end use of the composition. It is also known that the processability characteristics of a vinyl chloride polymer can advantageously be improved by incorporating a styrene/acrylonitrile copolymer in the vinyl chloride polymer. However, vinyl chloride polymer and styrene/acrylonitrile copolymer are only limitedly compatible so that there is no substantial improvement in toughness or any of the other physical properties of the polymer such as temperature resistance. Obviously, the end uses of vinyl chloride polymers can be greatly increased by providing compositions which are not only readily processed in existing operations but which also have improved temperature resistance, impact strength, and the like.

We have discovered that the compatibility of styrene/acrylonitrile copolymer in vinyl chloride polymer compositions can be increased by blending into said compositions a chloro-sulfonated ethylene polymer to form a ternary polyblend composition having improved properties.

An object of this invention is to provide improved vinyl chloride polymer compositions.

Another object of this invention is to provide ternary polyblend compositions of vinyl chloride polymer, styrene/acrylonitrile copolymer and chlorosulfonated ethylene polymer.

Another object of this invention is to provide a method for raising the impact strength of a vinyl chloride polymer composition.

Another object of this invention is to provide a method for raising the temperature resistance of vinyl chloride polymer compositions.

Other aspects, objects and advantages of this invention will be apparent from a consideration of the accompanying disclosure and appended claims.

In accordance with this invention, improved vinyl chloride compositions are made by incorporating small amounts of both styrene/acrylonitrile copolymer and chlorosulfonated ethylene polymer in vinyl chloride polymers to form a ternary polyblend of the same. The novel ternary polyblends of this invention comprise a major proportion of vinyl chloride polymer and a minor proportion of both styrene/acrylonitrile copolymer and chlorosulfonated ethylene polymer. Ordinarily, the ternary blends of this invention comprise 40–96 wt. percent vinyl chloride polymer, 2–30 wt. percent styrene/acrylonitrile copolymer and 2–30 wt. percent chlorosulfonated ethylene polymer. Preferably, the styrene/acrylonitrile copolymer is present in an amount in excess of the amount of chlorosulfonated ethylene polymer present; however, the chlorosulfonated ethylene polymer can somewhat less advantageously be present in an excess, if it is so desired. Although these proportions of addends in the novel vinyl chloride polymer compositions of this invention are preferred, other compositions outside the stated proportions can also be formed with fewer improvements of physical properties and with improvements to a lesser degree than are obtained in the preferred compositions.

The vinyl chloride polymers utilized in this invention are unplasticized polyvinyl chlorides and unplasticized interpolymers containing at least 80% of weight vinyl chloride and up to 20% by weight of one or more ethylenically unsaturated compounds such as vinyl acetate, vinylidene chloride, methyl acrylate, methyl methacrylate acrylonitrile, dibutyl maleate, and the like. Mixtures of such vinyl chloride polymers can also be used if desired.

The vinyl chloride polymers may be prepared by any of the polymerization techniques known to and employed by those skilled in the art, including such methods as solution, suspension, emulsion, and mass polymerization techniques. The vinyl chloride resins employed in the ternary compositions of this invention most generally have weight average molecular weights in the range of from 10,000 to 500,000, although higher or lower molecular weight vinyl chloride resins are useful to some extent in the present invention. The molecular weights referred to are determined by light scattering in methyl ethyl ketone solution.

The term "vinyl chloride polymer" as used herein is intended to include homopolymers of vinyl chloride, i.e., polymers prepared by subjecting to polymerization a monomeric material consisting of vinyl chloride as the sole polymerizable constituent, and copolymers of vinyl chloride with other ethylenically unsaturated monomers copolymerizable therewith; however, it is to be understood that such copolymers can be employed whenever reference is made herein to "polyvinyl chloride resins."

The styrene/acrylonitrile copolymers utilized in this invention are hard and tough thermoplastic materials high in molecular weight and prepared by polymerizing a monomeric mixture of styrene and acrylonitrile, which may also contain minor amounts of other copolymerizable monoolefinic monomers as minor constituents. Although styrene itself is a preferred monomer, other useful styrenes include methyl styrene, ethyl styrene, monochlorostyrene, dichlorostyrene, and similar styrenes copolymerizable with acrylonitrile. The acrylonitrile comonomer is preferably acrylonitrile itself; however, other useful acrylonitriles include methacrylonitrile, ethacrylonitrile, chloroacrylonitrile, and the like. The styrene/acrylonitrile copolymer may contain from 60–85 wt. percent styrene and from 15–40 wt. percent acrylonitrile, preferably from 65–85 wt. percent styrene and from 20–35 wt. percent acrylonitrile. A very advantageous sytrene/acrylonitrile copolymer for use in this invention contains 72% styrene and 28% acrylonitrile and is available commercially under the trade name "Bakelite RMD 4001." These styrene/acrylonitrile copolymers can be prepared by methods well known to those skilled in the art; for example, by polymerizing in solution, in mass, or in an aqueous medium.

The chlorosulfonated ethylene polymers incorporated in the ternary blends of this invention include chlorinated ethylene polymers as well as the chlorosulfonated ethylene polymers as are well known to those skilled in the art.

For example, certain commercial products sold under the trade name of "Hypalon" are chlorosulfonated polyethylenes and chlorinated polyethylenes. Chlorosulfonated ethylene polymers are made by chlorination and sulfonation of normally solid high molecular weight polymers of ethylene. Suitable ethylene polymers usually have number average molecular weights of at least 6000 and preferably above 15,000. Such ethylene polymers can be made readily by subjecting ethylene containing from 10 to 200 p.p.m. oxygen to polymerization at very high pressures, for example, 20,000 to 40,000 p.s.i. There are other methods for preparing solid polyethylenes, for example, by employing peroxide or azo catalysts and water or an organic liquid reaction medium along with moderately high pressures, for example, 5,000 to 15,000 p.s.i. Also, as is well known in the art, ethylene polymers of greater rigidity and higher density can be prepared at relatively low pressures, e.g., less than 1000 p.s.i., using organo-metallic and metal oxide-supported catalysts. If desired, the ethylene polymer which is chlorosulfonated may be one which is a copolymer of ethylene and an ethylenically unsaturated comonomer processed in an amount preferably not to exceed 15 wt. percent of the ethylene, for example, vinyl acetate, vinyl chloride, vinylidene chlorofluoride, methyl acrylate and methyl methacrylate.

The chlorosulfonation of the ethylene polymer can be effected in a number of different ways and one very suitable method for producing a preferred type of chlorosulfonated polyethylene is described in U.S. Patent 2,586,363. As disclosed therein, polyethylene is chlorosulfonated to form a polymer having a preferred chlorine content of about 25% to 37% by weight and a preferred sulfur content of from 0.4% to 3% by weight. One very suitable chlorosulfonated polyethylene for use in this invention contains about 27.5 wt. percent chlorine and about 1.5 wt. percent sulfur. The chlorine and sulfur atoms are believed to be chemically combined with the hydrocarbon chain of the polymer with most of the chlorine substituted on the chain and the sulfur combined with the chain as —$SO_2Cl$ groups. This material contains about one chlorine atom for every 6 to 7 carbon atoms and one —$SO_2Cl$ group for every 90 to 130 carbon atoms. In the preparation of the chlorosulfonated polyethylene, the chlorosulfonation can be effected by reacting the polyethylene with chlorine and sulfur dioxide, with $SO_2Cl_2$, or with $SO_2Cl_2$ and chlorine. Other procedures for making chlorosulfonated polyethylenes are described in the prior art, for example, in U.S. Patents 2,212,786, and 2,405,971. Preferably, the chlorosulfonated polyethylenes employed in the ternary blends of this invention have a chlorine content of from 10% to 50% by weight and a sulfur content of from 0.2% to 10% by weight although the sulfur content may be zero.

The ternary polyblend compositions of this invention are prepared by intimately admixing the vinyl chloride polymer, the styrene/acrylonitrile copolymer and the chlorosulfonated ethylene polymer together. These components may be mixed in any order and may be in any conventional form. Preferably, all three components are admixed together in a suitable container to form a rough mix which is then mixed on a conventional mixing machine of the type normally used for mixing rubber or plastics, e.g., a roll mill or a Banbury mixer. If desired, the vinyl chloride polymer can be first placed on a roll mill and, after a smooth rolling bank has formed in the nip of the rolls, the other two components of the blend added either separately or as a mixture. Regardless of the method by which the mixing of the ingredients is accomplished, it is necessary that the components be admixed together or worked under sufficient heat and pressure to insure efficient dispersion of the various components in the mixture to form a completely homogeneous material. The temperature at which this working or mastication is conducted is not critical so long as the temperature is at least above that where the vinyl chloride polymer fuses and not above the temperature where the vinyl chloride polymer decomposes. Usually a temperature above about 300° F. to 325° F. and less than about 350° F. to 375° F. is sufficient to obtain an adequately intimate combination of the materials. If desired, suitable minor ingredients can also be included in the ternary polyblends of this invention, including such ingredients as fillers, dyes, pigments, stabilizers, and the like. Preferably, heat stabilizers are added with vinyl chloride polymer as it is placed in the mixing equipment.

The ternary polyblend compositions obtained in this invention can be produced in any of the conventional forms. For example, the product can be calendered to form very thin, smooth sheets, press molded, laminated, embossed, cut, drilled or machined.

The advantages, desirability and the usefulness of the present invention are illustrated by the following example.

EXAMPLE

Vinyl chloride polymer binary and ternary blends containing varying proportions of addends were prepared mechanically by milling the various mixtures of ingredients on 3 x 8 inch Throppe mill rolls heated to a temperature of approximately 350° F. A rough mix was first prepared from the powdered vinyl chloride polymer, styrene/acrylonitrile copolymer, and the pelleted chlorosulfonated ethylene rubber cut-up into small pieces. The required amounts of these ingredients, together with 2% Thermolite 31 stabilizer, were admixed by hand in a stainless steel beaker. Thereafter, the rough mix was placed on the heated mill rolls and the components thoroughly homogenized by intensive hot milling for 5 minutes or until an adequate dispersion was obtained. The material was repeatedly cut back during the milling operation in order to make sure a complete dispersion of the components was obtained. After blending of the components was complete, as evidenced by visual inspection, the blends were sheeted and stripped from the mill rolls. The sheets were cooled to room temperature and cut into shapes approximating the configuration of the mold in which the compression-molded specimens were made. The material was molded between press polished plates using a Motch and Merryweather 30 ton compression molding press. The samples were first given a three minute preheat at a pressure of approximately 50 p.s.i.g. and then heated for a period of 5 minutes with a final temperature of approximately 350° F. and a final pressure of 1000 p.s.i. hydraulic pressure. At the end of this time, the specimens were cooled to room temperature with water and removed from the press. The desired physical test specimens were then cut from the compression molded material for the determination of various physical properties of the blend.

The physical properties of the various blends are reported in Table I. These physical properties were determined according to the standard ASTM procedures, more specifically the notched impact strength was determined by the Izod method as set forth in ASTM D–256–47T, the Clash-Berg data were determined according to ASTM D–1043–51, and the tensile strength properties were determined according to ASTM D–882–46.

The physical properties reported in Table I were measured on specimens prepared from a commercially available polyvinyl chloride resin identified as "Opalon 300" to which had been added 2% by weight of "Thermolite RS 31" which is a tin mercaptide heat stabilizer. The styrene/acrylonitrile copolymer was either an experimental polymer containing 76% styrene and 24% acrylonitrile, or a commercially available polymer identified as "Bakelite RMD 4001" containing 72% by weight of styrene and 28% by weight of acrylonitrile. The chlorosulfonated polyethylene rubber was obtained commercially and was identified as "Hypalon S2."

Table I
PROPERTIES OF VINYL CHLORIDE POLYMER-STYRENE/ACRYLONITRILE COPOLYMER CHLOROSULFONATED ETHYLENE POLYMER POLYBLENDS [1]

| Composition, percent | | | Izod Impact Strength, ft-lb../in. | Clash-Berg Data | | | Tensile Properties | |
|---|---|---|---|---|---|---|---|---|
| Vinyl Chloride Polymer [2] | Styrene/ Acrylo- nitrile Copolymer | Chloro- sulfonated Polyethylene [5] | | $T_f$, °C. | $T_{2000}$, °C. | SFR | Strength at break, p.s.i. | Percent Elonga- tion |
| 100 | — | — | 0.7 | 72.4 | 86.3 | 13.9 | 8000 | 160 |
| 87.5 | [3] 12.5 | — | — | 73.5 | 86.2 | 12.7 | 6720 | 150 |
| 93 | [3] 7 | — | 0.56 | 71.8 | 86.0 | 14.2 | 7360 | 175 |
| 78 | [4] 15 | 7 | 0.9 | 74.1 | 105.5 | 31.4 | 5300 | 33 |
| 83 | [4] 10 | 7 | 1.3 | 72.0 | 100.3 | 28.3 | 5200 | 55 |
| 88 | [4] 5 | 7 | 1.0 | 68.5 | 89.0 | 20.5 | 6000 | 166 |

[1] All polyblends contain 2% Thermolite 31 stabilizer.
[2] Opalon 300 vinyl chloride polymer.
[3] Styrene/acrylonitrile copolymer containing 76% styrene and 24% acrylonitrile.
[4] Bakelite RMD 4001 styrene/acrylonitrile containing 72% styrene and 28 %acrylonitrile.
[5] Hypalon S2 chlorosulfonated polyethylene.

The data in Table I show that the presence of chlorosulfonated polyethylene in a vinyl chloride-styrene/acrylonitrile copolymer composition substantially raises the rubber temperature ($T_{2000}$) of the composition, without causing large changes in the brittle temperature ($T_f$), thereby broadening the Stifflex range (SFR) from 2 to 3 times the value for either vinyl chloride polymer alone or for a binary mixture of vinyl chloride and styrene/acrylonitrile copolymer. The brittle temperature ($T_f$) is the temperature at which the stiffness modulus is 135,000 p.s.i. and the rubber temperature ($T_{2000}$) is the temperature at which the stiffness modulus is 2000 p.s.i. The Stifflex range (SFR) is determined by difference. The rubber temperature is a measure of the heat resistance of the composition because at temperatures above this temperature, the composition has no weight or load bearing characteristics. It is particularly desirable to have compositions with high heat resistant temperatures for the fabrication of household articles since these articles are very often washed in hot water. With reference to Table I, it will be noted that the presence of 7 wt. percent chlorosulfonated polyethylene rubber in vinyl chloride-styrene/-acrylonitrile copolymer compositions containing 15 wt. percent and 10 wt percent of the latter raised the $T_{2000}$ to temperatures of 105.5° C. and 100.3° C., respectively, which are temperatures above the boiling point of water. These increases in $T_{2000}$ are substantial when compared with the value of 86.3° C. for vinyl chloride polymer and 86.2° C. for a vinyl chloride-styrene/acrylonitrile copolymer binary polyblend. The increase in the Stifflex range (SFR) is also noteworthy because it indicates that the changes in the physical characteristics of the ternary polyblends for this invention vary gradually over a wide temperature range, and therefore, a failure of the compositions under load will not be sudden or immediate. For example, as shown in Table I the Stifflex range for a ternary polyblend containing 7% chlorosulfonated polyethylene and 15% styrene/acrylonitrile copolymer is 31.4 as compared with a value of 12.7 for a binary polyblend comprising 87.5% vinyl chloride polymer and 12.5% styrene/acrylonitrile copolymer.

It will also be noted from the data in Table I that the addition of chlorosulfonated polyethylene to a vinyl chloride polymer-styrene/acrylonitrile copolymer raises the Izod impact strength of the composition a significant amount. For example, a ternary polyblend containing 7% chlorosulfonated polyethylene and 10% styrene/acrylonitrile copolymer has an impact strength of 1.3 ft-lb/in. as compared with a value of 0.56 ft-lb/in. for a binary polyblend containing 93% vinyl chloride polymer and 5% styrene/acrylonitrile copolymer.

It is believed that these improvements in vinyl chloride polymer compositions are obtained by increasing the compatibility of styrene/acrylonitrile copolymer in vinyl chloride polymer by the addition of chlorosulfonated ethylene polymer to the composition since styrene/acrylonitrile copolymer is only limitedly compatible with vinyl chloride polymer.

The ternary blends of this invention are useful in making injection molded and compression molded articles, and can also be used in other forms, for example, as films, surface coatings, and monofilaments. They can also be mixed with other materials, such as pigments, plasticizers, natural and synthetic resins, fillers, and the like, according to procedures well known to those skilled in the art.

Reasonable variation and modification of the invention as described are possible, the essence of which is that there have been provided ternary polyblend compositions of vinyl chloride polymers comprising a major amount of a vinyl chloride polymer and a minor amount of both a styrene/acrylonitrile copolymer and a chlorosulfonated ethylene polymer, and methods for preparing the same.

We claim:

1. A rigid vinyl chloride polymer polyblend composition comprising from 40% to 96% by weight of the vinyl chloride polymer and the remainder styrene/acrylonitrile copolymer and a chloro-sulfonated ethylene polymer.

2. A rigid vinyl chloride resin composition comprising from 40% to 96% by weight of a vinyl chloride polymer, from 2% to 30% by weight of a styrene/acrylonitrile copolymer, and from 2% to 30% by weight of a chlorosulfonated ethylene polymer.

3. The composition of claim 2 wherein said styrene/acrylonitrile copolymer is present in an amount which is greater than the amount of said chlorosulfonated ethylene polymer.

4. The composition of claim 2 wherein said chlorosulfonated ethylene polymer contains a chlorine content of 10% to 50% by weight and a sulfur content of 0.2% to 10% by weight.

5. A rigid vinyl chloride resin composition comprising vinyl chloride polymer, 15% by weight styrene/acrylonitrile copolymer and 7% by weight chlorosulfonated polyethylene.

6. A rigid vinyl chloride resin composition comprising vinyl chloride polymer, 10% by weight styrene/acrylonitrile copolymer and 7% by weight chlorosulfonated polyethylene.

7. A rigid vinyl chloride resin composition comprising vinyl chloride polymer, 5% by weight styrene/acrylonitrile copolymers and 7% by weight chlorosulfonated polyethylene.

References Cited in the file of this patent
UNITED STATES PATENTS

| 2,646,417 | Jennings | July 21, 1953 |
| 2,889,308 | Fedderson | June 2, 1959 |
| 2,956,980 | Law | Oct. 18, 1960 |

OTHER REFERENCES

Renfrew et al.: "Polythene," Iliffe & Sons, Ltd. (London, 1957, 1st edition), pages 276–279.